Oct. 19, 1954

C. A. LIGHT 2,692,125

SCRAPPLE STIRRER

Filed May 1, 1953

INVENTOR.
Curtis Alvin Light,
BY Victor J. Evans & Co.

ATTORNEYS

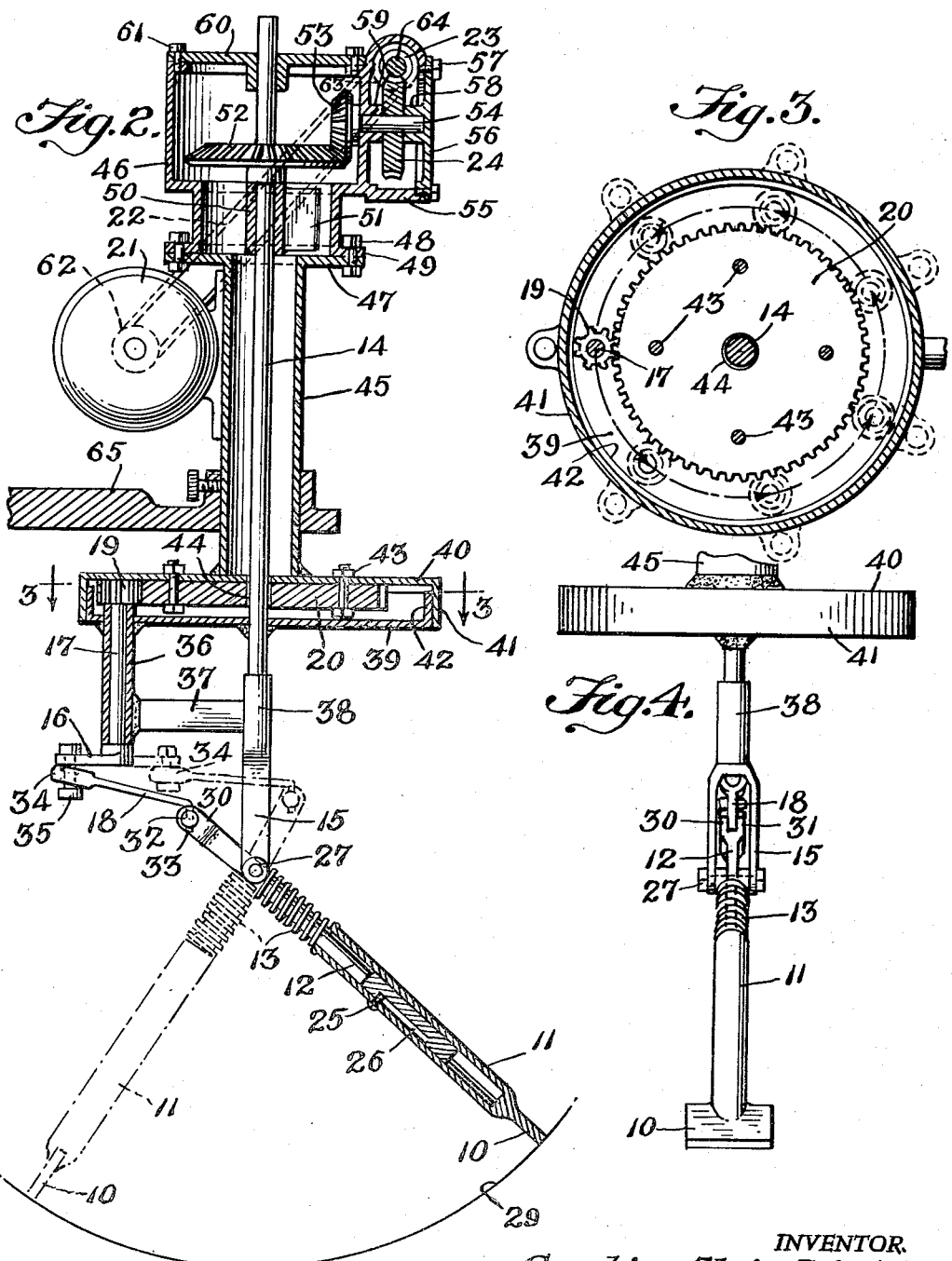

Patented Oct. 19, 1954

2,692,125

UNITED STATES PATENT OFFICE 2,692,125

SCRAPPLE STIRRER

Curtis Alvin Light, Palmyra, Pa.

Application May 1, 1953, Serial No. 352,325

6 Claims. (Cl. 259—116)

This invention relates to mixing machines for agitating food products in cooking, and in particular a machine for operating a scraping element to prevent food products burning on the bottom in cooking and which is particularly adapted for stirring products such as scrapple, pudding, applebutter, and the like.

The purpose of this invention is to provide a product stirrer in which a scraping element travels continuously over the inner surface of a cooking utensil to prevent the product sticking to the inner surface of the utensil.

Various types of mixing, beating, and agitating devices have been provided for cooking utensils and the like, however, because products of a certain consistency have a tendency to stick to the inner surface of a utensil in cooking it is desirable to provide means for actuating a scraping element whereby the element travels continuously over the inner surface of a utensil. With this thought in mind this invention contemplates a scraper carried by telescoping elements with the telescoping elements pivotally mounted in a rotating yoke and actuated by a crank positioned at one side of the yoke, wherein with both the yoke and crank rotated by transmission elements the scraper travels through an irregular path over the inner surface of the utensil upon which the device is mounted.

The object of this invention is, therefore, to provide means for actuating a scraping element whereby the element with the operating mechanism is adapted to be positioned on a utensil with the elements contacting the inner surface of the utensil.

Another object of the invention is to provide a stirring element and means for operating the element wherein yielding means is provided in the elements whereby the element is adapted to travel over an uneven surface.

A further object of the invention is to provide a stirring device adapted to be positioned on a cooking utensil in which the stirring device is of a simple and economical construction.

With these and other objects and advantages in view the invention embodies a cap or head, a spindle having a yoke on the lower end journaled in the head, a scraping element pivotally mounted in the yoke of the spindle, a stationary gear through which the spindle extends and in which the spindle is journaled, a crank actuated by a pinion meshing with the gear and connected to the scraper element and means mounted on the head for rotating the spindle.

Other features and advantages of the invention will appear from the following description taken in connection with the drawings, wherein:

Figure 2 is a vertical section through the mounting for the spindle and operating parts.

Figure 3 is a sectional plan taken on line 3—3 of Fig. 2 illustrating the path of travel of the pinion around the stationary gear.

Figure 4 is a front elevational view showing the mounting of the stirrer element or scraper.

Figure 1:
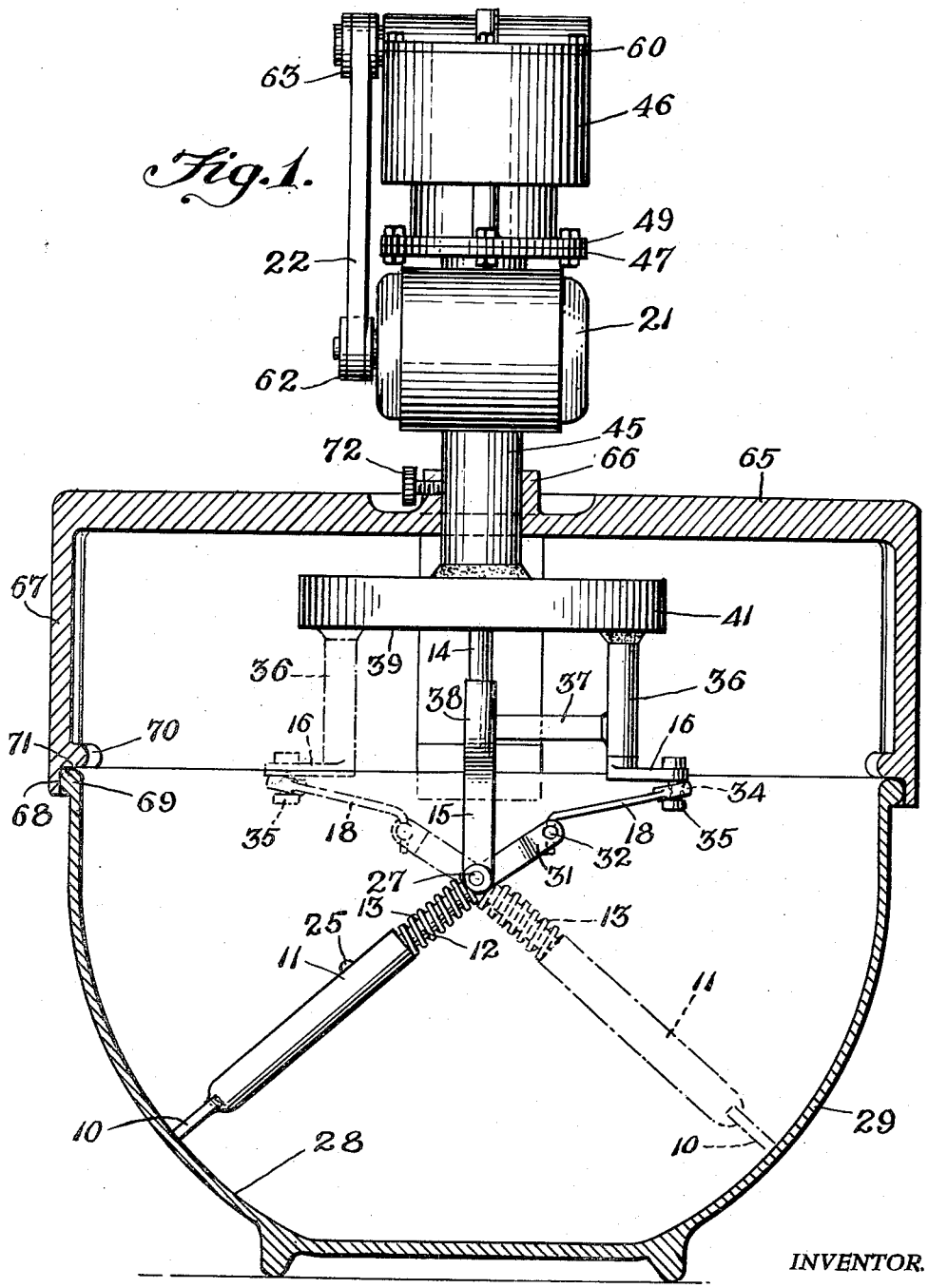
Figure 1 is a vertical section through the improved stirrer with the utensil and head shown in section and with the stirring elements and actuating instrumentalities therefor shown in elevation.

Referring now to the drawings wherein like reference characters denote corresponding parts the improved stirrer of this invention includes a scraper 10 positioned on the end of a tube 11 with the tube slidably mounted on a rod 12 and resiliently urged outwardly by a spring 13, a spindle 14 having a yoke 15 on the lower end in which the scraper element is pivotally mounted, a crank 16 extended from the lower end of a shaft 17, a link 18 connecting the crank 16 to the rod 12, a pinion 19 mounted on the upper end of the shaft 17 and meshing with a stationary gear 20, and a motor 21 connected by a belt 22 to a speed reduction unit including a worm 23 and a worm gear 24.

The tube 11 of the scraper 10 is provided with a pin 25 that extends into a slot 26 in one side of the rod 12 to limit outward movement of the tube and scraper and with the rod 12 pivotally mounted by a pin 27 in the arms of the yoke 15 the spring 13 urges the tube 11 and scraper 10 outwardly against the inner surface 28 of a utensil, as indicated by the numeral 29.

The upper end of the rod 12 is provided with spaced sections 30 and 31 between which a pin 32 through which the end 33 of the link 18 extends, as shown in Fig. 2 and the opposite end of the link is provided with an eye 34 through which a bolt 35 extends which pivotally connects the link to the crank 16.

The crank 16 is mounted on the lower end of the shaft 17 which is journaled in a sleeve 36 and the lower end of the sleeve is provided with an arm 37 that extends from a hub 38 which extends around and provides a bearing for the lower part of the spindle 14.

The sleeve 36 extends downwardly from a horizontally disposed, pan-shaped casing 39 in which the gear 20 and pinion 19 are positioned and the casing 39 is provided with a cover 40, a flange 41 of which extends over a similar flange 42 extended from the peripheral edge of the casing 39. The stationary gear 20 is secured to the cover 40 with bolts 43 and with the parts positioned, particularly as shown in Fig. 2 the gear 20 provides a bearing for the lower part of the spindle 14, the spindle passing through an opening 44 in the center of the gear.

The spindle 14 extends through a cylindrical section 45 of the casing, which extends upwardly from the cover 40 and a gear housing 46, which is positioned at the upper end of the cylinder 45, is mounted on a flange 47 at the upper end of the cylinder with bolts 48 that extend through a flange 49 at the lower end of the housing.

The lower section of the housing 46 is provided with a bearing 50 in which the upper end of the spindle 14 is journaled and the bearing is spaced from the lower section of the housing with radially disposed arms 51.

A beveled gear 52, mounted on the upper part of the spindle 14 is positioned to rest upon the upper end of the bearing 50 and, as shown in Fig. 2 the gear 52 meshes with a pinion 53 on a shaft 54 with which the worm gear 24 is journaled in a section 55 at one side of the gear housing. The section 55 of the gear housing is provided with an end plate 56 that is secured to the housing with bolts 57 and the inner surface of the plate 56 is provided with a hub 58 that provides a bearing for one end of the shaft 54. The opposite end of the shaft 54 is journaled in a bearing 59 on the outer surface of the housing 46. The housing 46 is also provided with a cover plate 60 that is secured to the upper end with bolts 61.

The motor 21 is mounted on the side of the cylinder 45, as shown in Fig. 2, and the belt 22 is trained over a pulley 62 on the motor and also over a pulley 63 on a shaft 64 on which the worm gear 23 is mounted.

The operating mechanism is mounted in a head 65 with the cylinder 45 extended through a hub 66 and, as shown in Fig. 1, the head 66 is provided with a depending flange 67 the lower edge of which is provided with an overhanging flange 68 that is positioned to extend over a bead 69 at the upper edge of a utensil, such as a utensil 29. The flange 67 is also provided with a bead 70 providing an annular recess 71 that is positioned to receive the upper edge of the utensil. The hub 66 is provided with a thumb screw 72 with which the device is adjustably mounted in the end whereby the position of the stirring element or scraper 10 in a utensil is adjustable.

With the parts formed in this manner the motor drives the spindle 14 through the worm and beveled gears and upon rotation of the spindle the pinion 19 is carried around the gear 20 with the shaft 17 rotating the crank 16 and thereby actuating the scraper mounting whereby the scraper follows the inner surface of a utensil, as indicated by the full and broken lines, shown in Figs. 1 and 2. In this movement the pan or casing 39 rotates in the cover 40, the cover 40 and gear 20 remaining stationary.

It will be understood that modifications, within the scope of the appended claims, may be made in the design and arrangement of the parts without departing from the spirit of the invention.

What is claimed is:

1. A stirrer comprising a vertically disposed spindle, a head adapted to be positioned on a cooking utensil, means journaling the spindle in the head, a scraper pivotally mounted on the lower end of the spindle, means for rotating the spindle, a crank arm geared to said spindle, and means pivotally connecting said crank arm to said scraper for actuating the scraper to travel over the inner surface of a utensil upon which the stirrer is positioned upon rotation of the spindle.

2. A stirring device comprising a vertically disposed spindle, a head adapted to be positioned on a cooking utensil positioned around the spindle, means journaling the spindle in the head, a scraper pivotally mounted on the lower end of the spindle, means for rotating the spindle, and a crank arm actuated by the spindle, said crank arm being offset from said spindle and operatively connected to the scraper for actuating the scraper upon rotation of the spindle.

3. A stirring device comprising a vertically disposed spindle, a head adapted to be positioned on a cooking utensil positioned around the spindle, means journaling the spindle in the head, a scraper pivotally mounted on the lower end of the spindle, means for rotating the spindle, and a crank arm actuated by the spindle, said crank arm being offset from said spindle and operatively connected to the scraper for actuating the scraper upon rotation of the spindle, said scraper having a yielding section therein with resilient means urging the scraper outwardly from the spindle.

4. In an agitator, the combination which comprises a head for use on a cooking utensil, a cylinder adjustably mounted in the head, a spindle having a yoke on the lower end extended through the cylinder, means at the upper and lower ends of the cylinder for journaling the spindle, transmission elements at the upper end of the cylinder for rotating the spindle, a telescoping unit having a blade providing a scraper on one end extended through the yoke of the spindle, means pivotally mounting the telescoping unit in said yoke, and actuating means carried by an arm extended from the spindle and connected to the telescoping unit for actuating the scraper blade upon rotation of the spindle.

5. In a cooking utensil scraper, the combination which comprises a head for use on the upper end of a cooking utensil, a cylinder adjustably mounted in the head, a gear carried by the lower end of the cylinder, a gear assembly mounted on the upper end of the cylinder, a spindle having a yoke on the lower end extended through the cylinder, a pinion positioned to travel around the gear at the lower end of the cylinder, said pinion actuated by an arm extended from the spindle, a scraper carried by a telescoping element mounted in the yoke of the spindle, and means operatively connecting the telescoping element to the pinion.

6. In a cooking utensil scraper, the combination which comprises a head for use on the upper end of a cooking utensil, a cylinder adjustably mounted in the head, a gear carried by the lower end of the cylinder, a gear assembly mounted on the upper end of the cylinder, a spindle having a yoke on the lower end extended through the cylinder, a pinion positioned to travel around the gear at the lower end of the cylinder, said pinion actuated by an arm extended from the spindle, a scraper carried by a telescoping element mounted in the yoke of the spindle, means operatively connecting the telescoping element to the pinion, and resilient means on said telescoping element urging the scraper away from the yoke.

References Cited in the file of this patent

UNITED STATES PATENTS

| Number | Name | Date |
|---|---|---|
| 553,027 | Eynon et al. | Jan. 14, 1896 |
| 1,762,081 | Schleicher | June 3, 1930 |
| 2,318,534 | Seybert | May 4, 1943 |

FOREIGN PATENTS

| Number | Country | Date |
|---|---|---|
| 834,855 | Germany | Mar. 24, 1952 |